(12) United States Patent
Putzig

(10) Patent No.: US 7,732,382 B2
(45) Date of Patent: Jun. 8, 2010

(54) CROSS-LINKING COMPOSITION AND METHOD OF USE

(75) Inventor: Donald Edward Putzig, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 1059 days.

(21) Appl. No.: 11/354,061

(22) Filed: Feb. 14, 2006

(65) Prior Publication Data

US 2007/0191233 A1    Aug. 16, 2007

(51) Int. Cl.
    *C09K 8/68* (2006.01)

(52) U.S. Cl. .................. 507/271; 507/211; 507/214; 507/215; 507/216; 507/217; 507/244; 507/260; 507/265; 507/267

(58) Field of Classification Search .................. None
See application file for complete search history.

(56) References Cited

U.S. PATENT DOCUMENTS

| | | | |
|---|---|---|---|
| 3,888,312 A * | 6/1975 | Tiner et al. ............... 166/308.5 |
| 4,385,097 A * | 5/1983 | Isozaki et al. ............... 428/458 |
| 4,462,917 A * | 7/1984 | Conway .................. 507/209 |
| 4,464,270 A * | 8/1984 | Hollenbeak et al. ......... 507/209 |
| 4,470,915 A | 9/1984 | Conway |
| 4,502,967 A | 3/1985 | Conway |
| 4,524,829 A | 6/1985 | Hanlon et al. |
| 4,657,080 A | 4/1987 | Hodge |
| 4,657,081 A | 4/1987 | Hodge |
| 4,683,068 A | 7/1987 | Kucera |
| 4,692,254 A | 9/1987 | Kucera |
| 4,749,040 A | 6/1988 | Hodge |
| 4,749,041 A | 6/1988 | Hodge |
| 4,797,216 A | 1/1989 | Hodge |
| 4,798,902 A * | 1/1989 | Putzig ..................... 556/54 |
| 4,799,550 A | 1/1989 | Harris et al. |
| 4,801,389 A | 1/1989 | Brannon et al. |
| 4,808,739 A * | 2/1989 | Putzig et al. .............. 556/55 |
| 4,861,500 A | 8/1989 | Hodge |
| 4,883,605 A * | 11/1989 | Putzig ..................... 507/203 |
| 4,953,621 A * | 9/1990 | Putzig et al. ............. 166/308.5 |
| 4,960,527 A | 10/1990 | Penny |
| 4,996,336 A * | 2/1991 | Putzig et al. .................. 556/55 |
| 5,069,281 A | 12/1991 | Tackett, Jr. |
| 5,100,932 A | 3/1992 | Lockhart et al. |
| 5,131,469 A | 7/1992 | Lockhart et al. |
| 5,132,029 A | 7/1992 | Lockhart et al. |
| 5,143,958 A | 9/1992 | Lockhart et al. |
| 5,145,590 A | 9/1992 | Dawson |
| 5,165,479 A | 11/1992 | Harris et al. |
| 5,305,832 A | 4/1994 | Gupta et al. |
| 5,431,226 A | 7/1995 | Sydansk |
| 5,642,783 A * | 7/1997 | Moradi-Araghi et al. .... 166/295 |
| 5,877,127 A | 3/1999 | Card et al. |
| 6,060,436 A | 5/2000 | Snyder et al. |
| 6,227,295 B1 * | 5/2001 | Mitchell et al. ............. 166/300 |
| 6,251,838 B1 | 6/2001 | Moorhouse et al. |
| 6,313,231 B1 | 11/2001 | Hosokawa et al. |
| 6,703,451 B2 | 3/2004 | Hosokawa et al. |
| 6,737,386 B1 | 5/2004 | Moorhouse et al. |
| 2003/0008780 A1 | 1/2003 | Chowdhary et al. |
| 2003/0092584 A1 * | 5/2003 | Crews ..................... 507/200 |
| 2003/0109385 A1 | 6/2003 | Gunn et al. |
| 2004/0031612 A1 | 2/2004 | Lord et al. |
| 2004/0173354 A1 * | 9/2004 | Hinkel et al. ............ 166/308.5 |
| 2005/0043454 A1 * | 2/2005 | Ushida et al. ............... 524/241 |
| 2006/0009363 A1 | 1/2006 | Crews |

FOREIGN PATENT DOCUMENTS

| EP | 0 278 684 A1 | 8/1988 |
| EP | 0 282 253 A2 | 9/1988 |
| WO | WO 99/47624 | 9/1999 |

* cited by examiner

*Primary Examiner*—James Seidleck
*Assistant Examiner*—John J Figueroa
(74) *Attorney, Agent, or Firm*—Kathryn M. Sanchez

(57) ABSTRACT

A cross-linking composition comprises (a) an aqueous liquid, (b) a pH buffer, (c) a cross-linkable organic polymer, (d) a cross-linking agent which comprises an organic titanate, an organic zirconate, or combinations thereof, and (e) a delay agent which is a hydroxyalkylaminocarboxylic acid. The composition provides flexibility in rate of cross-linking and can be used over a wide range of pH. Further disclosed are methods to use the composition in oil field applications for hydraulic fracturing and plugging of permeable zones and leaks in subterranean formations.

17 Claims, No Drawings

CROSS-LINKING COMPOSITION AND METHOD OF USE

FIELD OF THE INVENTION

The invention relates to the field of cross-linking compositions and their use in oil well fracturing and permeable zone plugging applications. The cross-linking composition comprises a cross-linking agent which is a zirconium or titanium complex or mixtures thereof, a cross-linkable organic polymer, and a delay agent.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates are usually incorporated into the composition to control viscosity.

Normally, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through zones depleted of oil (so-called "thief zones") rather than through those parts of the strata which contain sufficient oil to make oil-recovery operations profitable.

Difficulties in oil recovery due to high permeability of zones may be corrected by injecting an aqueous solution of an organic polymer and a cross-linking agent into certain subterranean formations under conditions where the polymer will be cross-linked to produce a gel, thus reducing the permeability of such subterranean formations to driving fluid (gas, water, etc.). Polysaccharide- or partially hydrolyzed polyacrylamide-based fluids cross-linked with certain aluminum, titanium, zirconium and boron-based compounds are also used in these enhanced oil recovery applications.

Cross-linked fluids or gels, whether for fracturing a subterranean formation or for reducing permeability of a subterranean formation, are now being used in hotter, deeper wells under a variety of pH conditions, where rates of cross-linking with known cross-linking compositions may be unacceptable. Rather than developing new cross-linking agents for these new conditions, the oil well service companies may add delay agents that effectively delay the cross-linking of a particular metal cross-linking agent under these conditions.

A number of patents disclose the use of various delay agents in combination with particular cross-linking agents for which they are effective. These patents typically specify adding one or more ingredients to a cross-linking composition or specify particular operating conditions, such as a narrow range of pH. There are only a limited number of disclosed delay agents suitable for titanium and zirconium cross-linking agents. Thus, use of delay agents with titanium and zirconium cross-linking agents has limited flexibility for use by the oil well service companies to stimulate or enhance recovery of oil or gas from a well or other subterranean formation.

There is a need for a cross-linking composition which is effective for delaying the action of titanium and zirconium cross-linking agents in oil recovery applications over a range of conditions. There is a need to be able to control rate of cross-linking so as to provide flexibility to a cross-linking agent, so that a range of cross-linking rates and may be achieved under a range of pH conditions with a single cross-linking composition. The present invention meets these needs.

SUMMARY OF THE INVENTION

This invention provides a cross-linking composition. The cross-linking composition comprises (a) an aqueous liquid, (b) a pH buffer, (c) a cross-linkable organic polymer, (d) a cross-linking agent which comprises an organic titanate, an organic zirconate, or combinations thereof, and (e) a delay agent which is a hydroxyalkylaminocarboxylic acid. The composition can be used over a wide range of pH, especially pH 3-12. Preferably the cross-linkable organic polymer is a solvatable polysaccharide. The preferred delay agent is bishydroxyethylglycine.

The composition of this invention is useful in oil field applications, for example, for hydraulically fracturing a subterranean formation using the cross-linking composition. The composition of this invention is further useful in for plugging a permeable zones or leak in a subterranean formation. The components of the cross-linking composition may be mixed prior to introducing them into the formation or the components can be introduced and permitted to react in the formation after a controllable period of time.

Surprisingly, the cross-linking composition of this invention can tolerate a range of temperature, pH and other conditions. Delay times can be controlled to provide flexibility through adjusting relative amounts of components, including cross-linking agent and delay agents.

DETAILED DESCRIPTION OF THE INVENTION

This invention provides a cross-linking composition and methods for use of the composition, especially for use in oil well applications such as methods for hydraulic fracturing and plugging of permeable zones in which rate of cross-linking of a cross-linkable polymer is delayed and controlled.

The cross-linking composition comprises (a) an aqueous liquid; (b) a pH buffer; (c) a cross-linkable organic polymer; (d) a cross-linking agent which comprises an organic titanate, an organic zirconate, or combinations thereof; and (e) a delay agent which is a hydroxyalkylaminocarboxylic acid. The composition may further comprise proppants, stabilizers, breakers, organic solvents, and the like.

The aqueous liquid may be water, a mixture of water and an alcohol, such as aqueous methanol or aqueous ethanol, or an aqueous solution comprising additional components. For example, an aqueous solution may comprise a clay stabilizer. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the total weight of the cross-linking composition.

The composition is useful over a wide range of pH. A pH buffer is added to the composition to control pH. The composition may comprise a pH buffer which is acidic, neutral or basic. The pH buffer is generally capable of controlling the pH from about pH 3 to about pH 12. For example, in a composition for use at pH of about 4-5, an acetic acid-based buffer can be used. In a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

Examples of suitable cross-linkable organic polymers include solvatable polysaccharides, polyacrylamides and polymethacrylamides. Preferably the organic polymer is a solvatable polysaccharides and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Gum derivatives include hydroxyethylguar (HEG), hydroxypropylguar (HPG), carboxyethylhydroxyethylguar (CEHEG), carboxymethylhydroxypropylguar (CMHPG), carboxymethyl guar (CMG), and the like. Cellulose derivatives include those containing carboxyl groups, such as carboxymethylcellulose (CMC), carboxymethylhydroxyethylcellulose (CMHEC), and the like. The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation.

The cross-linkable polymer is normally blended with a solvent such as water or mixed water/organic solvent or with the aqueous liquid as described above to form an uncrosslinked gel. Organic solvents that may be used include alcohols, glycols, polyols, and hydrocarbons such as diesel. As an example, the polymer may be blended with water, a water/alcohol mixture (e.g., where the alcohol is methanol or ethanol), or an aqueous solution comprising a clay stabilizer).

The cross-linking agent comprises an organic titanium complex, an organic zirconium complex or a combination thereof.

Suitable organic zirconium complexes for use in the composition of this invention include but are not limited to zirconium α-hydroxycarboxylic acid salt, zirconium polyol complexes, zirconium alkanol amine complexes, zirconium hydroxyalkylated alkylenediamine complexes, and combinations thereof. Examples of useful zirconium complexes include zirconium diethanolamine complex, zirconium triethanolamine complex, zirconium lactate, zirconium ethylene glycolate, zirconium acetylacetonate, zirconium ammonium lactate, zirconium diethanolamine lactate, zirconium triethanolamine lactate, zirconium diisopropylamine lactate, zirconium sodium lactate salts, zirconium glycerol complex, zirconium sorbitol complex, zirconium hydroxyalkylated ethylenediamine complexes, or combinations thereof.

The preferred zirconium complexes are zirconium polyol complexes and zirconium alkanol amine complexes. Polyols include glycerol, erythritol, threitol, ribitol, arabinitol, xylitol, allitol, altritol, sorbitol, mannitol, dulcitol, iditol, perseitol, and the like. Alkanol amines include those corresponding to the formula R'—N—CH$_2$—CH(OH)R")$_2$ wherein R' is hydrogen or —CH$_2$—CH(OH)R" and R" is hydrogen, methyl or ethyl. A more preferred zirconium complex is zirconium tetra-triethanolamine complex, which is available commercially from E. I. du Pont de Nemours and Company, Wilmington, Del., as Tyzor® TEAZ organic zirconate.

Suitable organic titanium complexes for use in the composition of this invention include but are not limited to titanium α-hydroxycarboxylic acid salt, titanium polyol complexes, titanium alkanol amine complexes, and combinations thereof. Examples of useful titanium complexes include titanium diethanolamine complex, titanium triethanolamine complex, titanium lactate, titanium ethylene glycolate, titanium acetylacetonate, titanium ammonium lactate, titanium diethanolamine lactate, titanium triethanolamine lactate, titanium diisopropylamine lactate, titanium sodium lactate salts, titanium sorbitol complexes, and combinations thereof.

The preferred titanium complexes are titanium alkanol amine complexes. Suitable alkanol amines are those described hereinabove. A more preferred titanium complex is titanium tetra-triethanolamine complex, which is available commercially from E. I. du Pont de Nemours and Company, Wilmington, Del. as Tyzor® TE organic titanate.

The cross-linking agent is generally used as a solution or suspension in an organic, aqueous or mixed aqueous/organic solvent. Organic solvents are typically alcohols, such as ethanol, n-propanol, i-propanol, and the like. For example, the cross-linking agent can be used as a solution in the aqueous liquid. The concentration of the cross-linking agent can vary and is typically from 0.01 to 1.0 weight %, based on the total weight of the cross-linking composition. The preferred concentration is 0.1 to 0.5 weight %, based on the total weight of the composition.

The delay agent is a hydroxyalkylaminocarboxylic acid. Preferably, the delay agent is selected from the group consisting of bishydroxyethylglycine, bishydroxymethylglycine, bishydroxypropylglycine, bishydroxyisopropylglycine, bishydroxybutylglycine, monohydroxyethylglycine, monohydroxymethylglycine and their alkali metal salts. More preferably the hydroxyalkylaminocarboxylic acid is bishydroxyethylglycine.

The delay agents are commercially available and/or may be prepared by processes described in the literature. For example, bishydroxyethylglycine suitable for this invention may be made by a number of processes described in the literature (see, Kromov-Borisov and Remizov, in *Zhur. Obshchei Khim.*, 1953, 23, 598; Gump, et al., in *J. Org. Chem.*, 1959, 24, 712-14). Bishydroxyethylglycine is also available commercially and sold under the generic name of "bicine".

The delay agent is typically used as an aqueous solution. The concentration of delay agent in the solution may vary and is typically from 0.1-75% by weight. The preferred concentration is 10-30 weight %, based on the total weight of the solution.

The composition may comprise optional components, including those which are common additives for oil field applications. Thus, the composition may further comprise one or more of proppants, friction reducers, bactericides, hydrocarbons, chemical breakers, stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, ammonium persulfate. Stabilizers include methanol, alkali metal thiosulfate, ammonium thiosulfate. Stabilizers may also include clay stabilizers such as hydrochloric acid and chloride salts, for example, tetramethylammonium chloride (TMAC) or potassium chloride.

The composition may also further comprise as optional components, a complexing agent or a polyfunctional organic compound, such as one or more of hydroxycarboxylic acid, aminocarboxylic acid, alkanolamine (hydroxyalkylamines, hydroxyalkyl alkylenediamines, polyhydroxyl compounds, sodium carbonate, and sodium bicarbonate. Hydroxycarboxylic acid includes polyhydroxyl carboxylic acid, hydroxy monocarboxylic acid, α-hydroxycarboxylic acid. Polyhydroxyl compounds include polyols and polyhydroxyl carboxylic acids.

Each component is present in the composition in an amount sufficient to achieve the desired cross-linking performance based on the individual components, desired delay in cross-linking time, temperature and other conditions present in the formation being fractured or permeable zone being plugged. Aqueous liquid is added in an amount sufficient to render the composition active for cross-linking the cross-linkable polymer by the cross-linking agent in the presence of the delay agent. The pH buffer is added in an amount sufficient to maintain pH of the composition in the desired pH range.

The amounts of cross-linkable polymer and the cross-linking agent may vary. One uses small but effective amounts, each of which will vary with the circumstances, e.g., the type of subterranean formation, the depth at which the method (e.g., fluid fracturing, permeable zone plugging or leak plugging) is to be performed, as well as temperature and pH, among other conditions. Generally one uses as small an amount of each as will provide the viscosity level necessary to effect the desired result, i.e., fracturing of the subterranean formation, or plugging of permeable zones or leaks in order to promote adequate recovery of oil or gas from a subterranean formation.

The amount of delay agent is dependent on the extent to which the rate of cross-linking is desired to be delayed. Typically the ratio of the delay agent to cross-linking agent, on a weight basis, is 0.001:1 to 100:1 of delay agent to cross-linking agent. Preferably when the delay agent is bishydroxyethylglycine, this ratio is 0.1-10:1 of delay agent to cross-linking agent. Within these broad ranges, the amount of delay agent selected for use is dependent on the type and amount of cross-linking agent being used, the temperature of the formation being fractured or permeable zone being plugged and the delay in cross-link time desired. As the weight ratio of delay agent to cross-linking agent is increased, the rate of cross-linking, i.e., gel formation is reduced or cross-link time is increased. At higher ratios of delay agent to cross-linking agent, higher temperature may be needed to initiate cross-linking. The maximum viscosity of the final gel decreases as cross-link times are increased. By controlling the rate of cross-linking of the polymer by the use of a delay agent in combination with a single cross-linking agent over the variety of pH and temperature conditions experienced in the field, one can minimize premature cross-linking on the surface and subsequent viscosity loss due to shear degradation.

The composition of this invention may be produced by mixing the aqueous liquid, pH buffer, organic polymer, cross-linking agent and delay agent, along with any optional components in any order. For example, in a particular application in the oil field, the components may be introduced into a subterranean formation as separate streams, or two or more of the components may be premixed and introduced into the formation as a combined stream, or all components may be premixed and introduced as a single stream. Preferably, the cross-linkable polymer is not premixed with the cross-linking agent. When these two components are premixed, they are premixed just prior to the use of the composition, that is, introducing the mixture into a subterranean formation, for example, for hydraulic fracturing or plugging of subterranean permeable zones or leaks. Advantageously, the components may be mixed in different combinations, and more advantageously, the components may be mixed just prior to use to enable easy variation and adjustment of the cross-linking rate.

The compositions of this invention provide advantages over those of the prior art when used in methods for hydraulic fracturing or plugging of subterranean zones or leaks. The compositions can be modified to provide a range of cross-linking rates with a single cross-linking agent. The compositions can be used at both high and low pH. The compositions can be used at high temperatures at acceptable rates. The compositions can be used with fluids containing a high level of brine. Thus, the compositions can be used in hot subterranean formations, including those at greater depths in oil and gas wells. The compositions provide excellent performance in hydraulic fracturing and for selectively plugging permeable zones and leaks in subterranean formations.

The present invention further provides methods of using the cross-linking composition of this invention. In a hydraulic fracturing method of this invention, one or more fractures is created, reopened, and/or extended in an oil- or gas-containing subterranean. Thus, this invention provides a method for fracturing a subterranean formation which comprises introducing into said formation a cross-linking composition at a flow rate and pressure sufficient to create, reopen and/or extend a fracture in said formation, wherein said composition comprises (a) an aqueous liquid, (b) a pH buffer, (c) a cross-linkable organic polymer, (d) a cross-linking agent which comprises an organic titanate, an organic zirconate, or combinations thereof, and (e) a delay agent which is a hydroxyalkylaminocarboxylic acid.

In a first embodiment of the method for hydraulically fracturing a subterranean formation, the cross-linkable organic polymer and the cross-linking agent are contacted prior to their introduction into the subterranean formation, such that the polymer and cross-linking agent react to form a cross-linked aqueous gel, which gel is then introduced into the formation.

In one example of the first embodiment of the hydraulic fracturing method, a base gel is prepared by mixing an aqueous liquid with a cross-linkable organic polymer and a delayed cross-linking composition is prepared by mixing a cross-linking agent which comprises an organic titanate, an organic zirconate, or combinations thereof, with a delay agent which is a hydroxyalkylaminocarboxylic acid. A pH buffer is added to the base gel, the delayed cross-linking composition, or both. In this embodiment, more specifically, the method for hydraulically fracturing a subterranean formation comprises (a) preparing a base gel; (b) preparing a delayed cross-linking composition; (c) contacting the base gel with the delayed cross-linking composition; (d) permitting the base gel and the cross-linking agent to react after a controllable amount of time to form a cross-linked aqueous gel; and (e) introducing the cross-linked gel into the formation at a flow rate and pressure sufficient to create, reopen, and/or extend a fracture in the formation.

In a second example of the first embodiment, a base gel is prepared by mixing an aqueous liquid with a cross-linkable polymer and a delay agent which is a hydroxyalkylaminocarboxylic acid. In this embodiment, the method for hydraulically fracturing a subterranean formation comprises (a) preparing a base gel; (b) contacting the base gel with a cross-linking agent which comprises an organic titanate, an organic zirconate, or combinations thereof; (c) permitting the base gel and the cross-linking agent to react after a controllable amount of time to form a cross-linked aqueous gel; and (d) introducing the cross-linked gel into the formation at a flow rate and pressure sufficient to create, reopen, and/or extend a fracture in the formation. In this second embodiment, a pH buffer is admixed with the base gel, the cross-linking agent, or both, prior to contacting the base gel with the cross-linking agent.

In a modification of this first embodiment, the subterranean formation may be penetrated by a wellbore, such that contacting the base gel with the cross-linking agent occurs in the wellbore and the cross-linked aqueous gel is introduced into the formation from the wellbore at a flow rate and pressure sufficient to create, reopen and/or extend a fracture in the formation.

In a second embodiment, components of a cross-linking composition are introduced separately, either sequentially or simultaneously, into a subterranean formation such that cross-linking occurs within the subterranean formation. The method of this embodiment for hydraulically fracturing a subterranean formation penetrated by a wellbore comprises (a) preparing a base gel by mixing an aqueous liquid with a cross-linkable polymer; (b) introducing the base gel into the wellbore; (c) simultaneously with or sequentially after, introducing the base gel into the wellbore, introducing a cross-linking agent which comprises an organic titanate, an organic zirconate, or combinations thereof into the wellbore; wherein a pH buffer and a delay agent which is a hydroxyalkylaminocarboxylic acid are independently admixed with the base gel, the cross-linking agent or both prior to introducing the base gel and the cross-linking agent into the wellbore; (d) permitting the base gel and the cross-linking agent to react after a controllable period of time to form a cross-linked aqueous gel; and (e) introducing the cross-linked gel into the formation from the wellbore at a flow rate and pressure sufficient to create, reopen, and/or extend a fracture in the formation.

Upon creation of a fracture or fractures, the method may further comprise introducing a cross-linking composition comprising (a) an aqueous liquid, (b) a pH buffer, (c) a cross-linkable organic polymer, (d) a cross-linking agent which comprises an organic titanate, an organic zirconate, or combinations thereof, (e) a delay agent which is a hydroxyalkylaminocarboxylic acid and (f) proppant, into the fracture or fractures. This second introduction of a cross-linking composition is preferably performed in the event the cross-linking composition used to create the fracture or fractures did not comprise proppant. The cross-linking composition may subsequently be recovered from the formation.

In the method for fracturing a subterranean formation, satisfactory gels can generally be made by using the cross-linkable organic polymer in amounts up to about 1.2 weight % and the cross-linking agent in amounts up to about 1.0 weight %, both percentages being based on the weight of the aqueous liquid. Preferably, from about 0.25 to about 0.75 weight % of the cross-linkable organic polymer is used and from about 0.05 to about 0.50 weight % of the cross-linking agent is used, both percentages being based on the weight of the aqueous liquid.

In another method of this invention, the composition of this invention is used to plug a permeable zone or leak in a subterranean formation. This method comprises introducing a cross-linking composition (or cross-linked gel) into the permeable zone or leak.

More specifically, the method of plugging a permeable zone or a leak in a subterranean formation comprises introducing into said zone or said leak, a cross-linking composition comprising (a) an aqueous liquid, (b) a pH buffer, (c) a cross-linkable organic polymer, (d) a cross-linking agent which comprises an organic titanate, an organic zirconate, or combinations thereof, and (e) a delay agent which is a hydroxyalkylaminocarboxylic acid.

In a first embodiment of the method for plugging a permeable zone or a leak in a subterranean formation, the cross-linkable organic polymer and the cross-linking agent are contacted prior to their introduction into the subterranean formation, such that the polymer and cross-linking agent react to form a cross-linked aqueous gel, which gel is then introduced into the formation.

In one example of the first embodiment of the plugging a permeable zone or a leak in a subterranean formation method, a base gel is prepared by mixing an aqueous liquid with a cross-linkable organic polymer and a delayed cross-linking composition is prepared by mixing a cross-linking agent which comprises an organic titanate, an organic zirconate, or combinations thereof, with a delay agent which is a hydroxyalkylaminocarboxylic acid. A pH buffer is added to the base gel, the delayed cross-linking composition, or both. In this embodiment, more specifically, the method comprises (a) preparing the base gel; (b) preparing a delayed cross-linking composition; (c) contacting the base gel with the delayed cross-linking composition; (d) permitting the base gel and the cross-linking agent to react after a controllable amount of time to form a cross-linked aqueous gel; and (e) introducing the cross-linked gel into the permeable zone or leak.

In a second example of the first embodiment, a base gel is prepared by mixing an aqueous liquid with a cross-linkable polymer and a delay agent which is a hydroxyalkylaminocarboxylic acid. In this embodiment, the method for plugging a permeable zone or leak comprises (a) preparing the base gel; (b) contacting the base gel with a cross-linking agent which comprises an organic titanate, an organic zirconate, or combinations thereof; (d) permitting the base gel and the cross-linking agent to react after a controllable amount of time to form a cross-linked aqueous gel; and (e) introducing the cross-linked gel into the permeable zone or leak. In this second embodiment, a pH buffer is added to the base gel or admixed with cross-linking agent.

In a second embodiment, components of a cross-linking composition are introduced separately into a permeable zone or leak in a subterranean formation such that cross-linking occurs within the subterranean formation. The method of this embodiment comprises (a) preparing a base gel by mixing an aqueous liquid with a cross-linkable polymer; (b) introducing the base gel into the permeable zone or leak; (c) simultaneously with or sequentially after, introducing the base gel into the permeable zone or leak, introducing a cross-linking agent which comprises an organic titanate, an organic zirconate, or combinations thereof into permeable zone or leak; wherein a pH buffer and a delay agent which is a hydroxyalkylaminocarboxylic acid are independently admixed with the base gel, the cross-linking agent or both prior to introduction of the base gel and the cross-linking agent into the permeable zone or leak; and (d) permitting the base gel and the cross-linking agent to react after a controllable period of time to form a cross-linked aqueous gel to plug the permeable zone or leak.

In a method for plugging permeable zones or leaks in subterranean formations, one generally uses about 0.25 to 1.2 weight % of a cross-linkable organic polymer, preferably 0.40 to 0.75 weight %, and 0.01 to 1.0 weight % of a cross-linking agent, preferably 0.05 to 0.50 weight %, all percentages being based on the weight of the aqueous liquid.

EXAMPLES

Methods

Preparation of a Base Gel:

One liter of tap water was added to a Waring blender jar equipped with a three bladed paddle stirrer. Agitation was started and 3.6 g of a solvatable polysaccharide polymer was added, followed by a clay stabilizer (tetramethylammonium chloride) and a buffer selected to adjust the pH to 4.0-7.0 to provide a solution. The rate of agitation was adjusted to maintain a slight vortex at the top of the solution and agitation continued for 30 minutes, which produced a "30 lb/1000 gallon" base gel. After 30 minutes, the pH of the base gel was adjusted to the desired final pH with (1) an acetic acid-based buffer for pH 4-5; (2) a fumaric acid or sodium diacetate-based buffer for pH 5-7; (3) a sodium bicarbonate-based buffer for pH 7-8.5; or (4) a sodium carbonate or sodium hydroxide-based buffer for pH 9-11. Agitation was stopped and the base gel allowed to sit for 30 minutes.

Alternatively, for a "20 lb/1000" gallon base gel, 2.4 g of polymer was added to one liter of tap water. For a "60 lb/1000" gallon base gel, 7.2 g of polymer was added to one liter of tap water.

Vortex Closure Test:

A 250 ml portion of base gel was measured into a clean Waring blender jar. Agitation was started and the rate adjusted to create a vortex exposing the blade nut. The setting on the Variac controlling the blender speed was recorded and kept constant for all tests for reproducibility. An amount of cross-linking agent was injected into the edge of the vortex of the agitated base gel and a stopwatch immediately started, which set time=0. When the viscosity of the gel increased sufficiently to allow the fluid to cover the nut on the blade of the blender jar and the vortex remained closed, the time was recorded. This time, that is the difference between the time the stopwatch started and the time the vortex remained closed, is the vortex closure time. If the vortex had not closed within 10 minutes, the test was discontinued and a vortex closure time of greater than 10 minutes was recorded. The beginning and final pH of the cross-linked gel were also recorded as pHb and pHf, respectively. Such vortex closure tests provide a means for obtaining a reasonably good estimate of the time required to complete cross-linking of the polymer by the cross-linking agent. Complete closure of the vortex indicates a substantial degree of cross-linking.

The test was repeated using the same base gel and cross-linking agent. However, a specified amount of bishydroxy-ethylglycine delay agent was injected immediately following the injection of the cross-linking agent. The vortex closure time was recorded in a similar fashion. Results for the cross-linking compositions are provided below.

Note 1: 0.2% by weight of the total composition of tetramethyl ammonium chloride was used as clay stabilizer.

Note 2: A 30 lb/1000 gallon carboxymethylcellulose (CMC) base gel, prepared in 1 gal/1000 gal of 50% TMAC solution in water was used to measure the vortex closure times at pH 4.

Note 3: A 20 lb/1000 gal carboxymethylcellulose (CMC) base gel, prepared in 1 gal/1000 gal of 50% TMAC solution in water was used to measure the vortex closure times at pH 5.

Note 4: A 60 lb/1000 gal carboxymethylhydroxypropylguar (CMHPG) base gel was used to measure the vortex closure times at pH 10.

Example 1

Sodium chloroacetate (237 g) was added to 422 g of tap water in a 2-liter flask equipped with a dropping funnel, thermocouple, condenser and nitrogen bubbler. Agitation was started and heat applied to dissolve the sodium chloroacetate. After the sodium chloroacetate dissolved, 218 g of diethanolamine (99%) were added, and the reaction mass heated to reflux and held there for 10 hours. On cooling the solution was diluted with 510 g of water to give a clear, water white solution containing 24% bishydroxyethylglycine. The product of Example 1 was evaluated as a delay agent with each of the products of Examples 2-5 and Comparative Example D.

Example 2

A 500-ml flask, equipped with a thermocouple, dropping funnel, nitrogen bleed and condenser, was charged with 313.7 g of zirconium tetra-triethanolamine complex, available from E. I. du Pont de Nemours and Company, Wilmington, Del. Agitation was started and a mixture of 20.9 g of glycerol and 20.9 g of water were added. The solution was agitated for 2 hours at 60° C. to give 355 g of an orange solution containing 11.6% Zr. Table 1A provides results using the product of Example 2 in the Vortex Closure Test.

Example 3

A 500-ml flask, equipped with a thermocouple, dropping funnel, nitrogen bleed and condenser, was charged with 313.7 g of zirconium tetra-triethanolamine complex. Agitation was started and the following were added: 132.6 g of Quadrol® tetrakis(2-hydroxypropyl) ethylenediamine, available from BASF Corp., and a mixture of 42 g of glycerol and 42 g of water. The solution was agitated for 2 hours at 60° C. to give 530 g of an orange solution containing 7.8% Zr. Table 1B provides results using the product of Example 3 in the Vortex Closure Test.

Comparative Example A

A 1000-ml flask equipped with agitator, a condenser, a dropping funnel, a thermocouple and a nitrogen bleed was charged with 352 g (0.799 mol) of tetra-n-propylzirconate. Agitation was started and 230.8 g (0.83 mol) of hydroxyethyl tris-(2-hydroxypropyl)ethylenediamine were added. The reaction mass was heated to 60° C. and held there for 2 hours. After the hold period the reaction mass was cooled to room temperature to yield a viscous, clear yellow liquid containing 12.3% Zr. Table 1C provides results using the product of Comparative Example A in the Vortex Closure Test.

Comparative Example B

A 1000-ml flask equipped with agitator, a condenser, a dropping funnel, a thermocouple and a nitrogen bleed, was charged with 364 g (0.826 mol) of tetra-n-propylzirconate. Agitation was started and 493.4 g (3.3 mol) of triethanolamine were added. The reaction mass was heated to 60° C. and held there for 2 hours. After the hold period, a 20 mm Hg vacuum was applied to remove the n-propanol liberated in the reaction. The reaction mass was then cooled to room temperature to yield a viscous, clear yellow liquid containing 13.2% Zr. Table 1C provides results using the product of Comparative Example B in the Vortex Closure Test.

Comparative Example C

A 1000-ml flask equipped with agitator, a condenser, a dropping funnel, a thermocouple and a nitrogen bleed, was charged with 368.6 g (0.609 mol) of zirconium oxychloride, dissolved as 30% aqueous solution. Agitation was started and 40 g (0.83 mol) of water were added. Next, 181.3 g (1.77 mol) of 85% lactic acid were rapidly added under high speed agitation, while temperature was maintained at 20-30° C. The reaction mass was stirred an additional hour at 20-30° C. and then neutralized to pH 6.7-7.3 with 25% aqueous sodium hydroxide solution. The reaction mass was then heated to 80° C. and held there for 4 hours. After the hold period the reaction mass was cooled to room temperature to yield a clear, pale yellow liquid containing 5.4% Zr. Table 1C provides results using the product of Comparative Example C in the Vortex Closure Test.

TABLE 1A

| Cross-linking Agent | Conc (ml/ 1000 ml) | Delay Agent | Conc (ml/ 1000 ml) | Vortex Closure Time (min:sec) pH 4 | Vortex Closure Time (min:sec) pH 5 |
| --- | --- | --- | --- | --- | --- |
| Example 2 | 0.35 | none | 0 | 1:10 | |
| Example 2 | 0.35 | Example 1 | 1 | 2:05 | |
| Example 2 | 0.35 | glycerol (70%) | 1 | 1:22 | |
| Example 2 | 0.35 | sorbitol (70%) | 1 | 1:04 | |
| Example 2 | 0.70 | Example 1 | 1 | | 2:39 |
| Example 2 | 0.70 | none | 0 | | 0:59 |
| Example 2 | 0.70 | glycerol (70%) | 1 | | 2:01 |
| Example 2 | 0.70 | sorbitol (70%) | 1 | | 1:05 |

TABLE 1B

| Cross-linking Agent | Conc (ml/ 1000 ml) | Delay Agent | Conc (ml/ 1000 ml) | Vortex Closure Time (min:sec) pH 4 | Vortex Closure Time (min:sec) pH 5 |
| --- | --- | --- | --- | --- | --- |
| Example 3 | 0.50 | None | 0 | 1:14 | |
| Example 3 | 0.50 | Example 1 | 1 | 3:03 | |
| Example 3 | 0.50 | glycerol (70%) | 1 | 1:42 | |
| Example 3 | 0.50 | sorbitol (70%) | 1 | 1:18 | |
| Example 3 | 1.0 | None | 0 | | 1:23 |
| Example 3 | 1.0 | Example 1 | 1 | | 4:49 |
| Example 3 | 1.0 | glycerol (70%) | 1 | | 2:39 |
| Example 3 | 1.0 | sorbitol (70%) | 1 | | 1:33 |
| Example 3 | 0.50 | Example 1 | 0 | 3:50 | |
| Example 3 | 0.50 | Example 1 | 0.5 | 7:45 | |
| Example 3 | 0.50 | Example 1 | 1 | >10 | |
| Example 3 | 0.75 | Example 1 | 0 | | 1:44 |
| Example 3 | 0.75 | Example 1 | 0.5 | | 5:29 |
| Example 3 | 0.75 | Example 1 | 1 | | >10 |

TABLE 1C

| Cross-linking Agent | Conc (ml/ 1000 ml) | Delay Agent | Conc (ml/ 1000 ml) | Vortex Closure Time (min:sec) pH 4 | Vortex Closure Time (min:sec) pH 5 |
| --- | --- | --- | --- | --- | --- |
| Comp. Ex. A. | 0.4 | None | — | 0:02 | 0:23 |
| Comp. Ex. B | 0.08 | None | — | >10 | |
| Comp. Ex. B | 0.12 | none | — | | 0:32 |
| Comp. Ex. C | 0.20 | None | — | 6:17 | |
| Comp. Ex. C | 0.28 | None | — | | >10 |

Tables 1A-1C provide the evaluation results for the vortex closure times when using cross-linking compositions comprising different delay agents, including compositions comprising the products of Examples 1 and 2 and of Comparative Examples A, B and C, at pH 4 and at pH 5. From Tables 1A-1C, it can be seen that bishydroxyethylglycine is a much more effective delay agent at pH 4 and pH 5 than glycerol and sorbitol, which are delay agents disclosed in the prior art.

Table 1B illustrates the effect of increasing the delay agent concentration on rate of cross-linking. That is, higher amounts of delay agent increase rate of cross-linking.

In order to meet the performance requirements for use in a low pH fracturing fluid cross-link times at either pH 4 or pH 5 should typically be within a period of time of 2 seconds to 5 minutes. The vortex closure times of Comparative Examples, which lack the bishydroxyethylglycine delay agent are outside of this time period.

Comparative Example D

The effect of various delay agents in combination with a boron compound, boric acid, as a cross-linking agent were determined using the Vortex Closure Test as described above. Equimolar amounts of delay agent and boric acid (0.15 g) were added to a 30 lb/100 gallon CMHPG base gel in which pH was adjusted to about pH 12 using sodium hydroxide. The vortex closure times in minutes are provided in Table 2.

TABLE 2

Rate of Cross-linking of Boric Acid with Bishydroxyethylglycine

| Delay Agent (amount added) | Vortex Closure Time (min.) | pHb | pHf |
| --- | --- | --- | --- |
| No Delay Agent | 0:48 | 12.90 | 12.59 |
| Sodium Glutamate (0.75 g) | 6:13 | 12.90 | 12.57 |
| Sorbitol (0.85 g) | >10 | 12.95 | 12.58 |
| Example 1 (2.67 g) | 0:53 | 12.95 | 12.60 |
| Example 1 (5.37 g) | 0:37 | 12.97 | 12.58 |

As can be seen from Table 2, use of the composition of Example 1, bishydroxyethylglycine, is a poor delay agent for the boron cross-linking agent. The vortex closure time when using boric acid as a cross-linking agent is substantially the same with or without addition of bishydroxyethylglycine. In contrast, other known delay agents (sodium glutamate and sorbitol) are effective at increasing the vortex closure time when used with the boron cross-linking agent.

Example 4

A 500-ml flask, equipped with a thermocouple, dropping funnel, nitrogen bleed and condenser, was charged with 313.7 g of zirconium tetra-triethanolamine complex. Agitation was started and the following were added to the flask: 132.6 g of Quadrol® tetrakis(2-hydroxypropyl)ethylenediamine and a mixture of 42 g of glycerol and 21 g of water. The solution was agitated for 2 hours at 60° C. to give 509 g of an orange solution containing 8.1% Zr.

The product was evaluated in the Vortex Closure Time test along with a commercially available zirconate cross-linking agent, zirconium tetra-triethanolamine complex, available from E. I. du Pont de Nemours and Company, Wilmington, Del. Each cross-linking agent was used in an equimolar amount. A 60 lb/1000 gal CMHPG base gel prepared as described above under Preparation of a Base Gel was used. Sodium hydroxide was used to provide a pH of 10. A test was performed in the absence and then in the presence of bishydroxyethylglycine, the product of Example 1.

TABLE 3

| Cross-linking Agent | Conc. Cross-linking Agent ml/1000 ml | Conc. Example 1 ml/1000 ml | Vortex Closure Time (min.) | pHb | pHf |
|---|---|---|---|---|---|
| Example 4 | 1.08 | 0 | 7:24 | 10.00 | 10.04 |
| Example 4 | 1.08 | 0.25 | >10 | 10.00 | 9.80 |
| Zirconium tetra-triethanolamine complex | 0.68 | 0 | 1:52 | 10.00 | 10.00 |
| Zirconium tetra-triethanolamine complex | 0.68 | 0.25 | 8:47 | 10.00 | 9.84 |

Table 3 shows that bishydroxyethylglycine is very effective at pH 10 in delaying the rate by cross-linking of zirconate complexes such as the zirconium complex prepared in Example 4 or a commercial zirconium cross-linking agent, zirconium tetra-triethanolamine complex.

Example 5

Two commercially available titanium cross-linking agents, titanium triethanolamine complex (available as Tyzor® TE organic titanate) and titanium ammonium lactate (available as Tyzor® LA organic titanate), both from E. I. du Pont de Nemours and Company, Wilmington, Del., were evaluated in the Vortex Closure Time test. Each cross-linking agent was used in an amount of 0.52 ml per 1000 ml of solution of the 60 lb/1000 gal CMHPG prepared as described above under Preparation of a Base Gel. Sodium hydroxide was used to provide a pH of 10. A test was performed in the absence and then in the presence of bishydroxyethylglycine, the product of Example 1.

TABLE 4

| Cross-linking Agent | Conc. Example 1 (ml/1000 ml) | Vortex Closure Time (min.) |
|---|---|---|
| Titanium triethanolamine complex | 0 | 1:06 |
| Titanium triethanolamine complex | 0.25 | 4:12 |
| Titanium ammonium lactate | 0 | 4:01 |
| Titanium ammonium lactate | 0.25 | >10 |

Table 4 shows that bishydroxyethylglycine is very effective at pH 10 in delaying the rate of cross-linking by titanate complexes.

What is claimed is:

1. A cross-linking composition comprising (a) an aqueous liquid, (b) a pH buffer, (c) a cross-linkable organic polymer, (d) a cross-linking agent which comprises an organic titanate, an organic zirconate, or combinations thereof, wherein the organic titanate is selected from the group consisting of titanium a-hydroxycarboxylic acid salt, titanium polyol complexes, titanium alkanol amine complexes, and combinations thereof; and wherein the organic zirconate is selected from zirconium a-hydroxycarboxylic acid salt, zirconium polyol complexes, zirconium alkanol amine complexes, zirconium hydroxyalkylated alkylenediamine complexes, and combinations thereof; and (e) a delay agent which is a hydroxyalkylaminocarboxylic acid.

2. The composition of claim 1 wherein the cross-linkable organic polymer is a solvatable polysaccharide selected from gums, gum derivatives, and cellulose derivatives.

3. The composition of claim 2 wherein the polysaccharide is a gum selected from guar gum, locust bean gum, galactomannan gum and glucomannan gum, sennas, Brazilwood, tera, honey locust, and karaya gum.

4. The composition of claim 2 wherein the polysaccharide is a gum derivative selected from hydroxyethylguar, hydroxypropylguar, carboxyethylhydroxyethylguar, carboxymethylhydroxypropylguar, and carboxymethyl guar.

5. The composition of claim 2 wherein the polysaccharide is a cellulose derivative selected from carboxymethylcellulose and carboxymethylhydroxyethylcellulose.

6. The composition of claim 1 wherein the zirconium complex is a zirconium polyol complex or a zirconium alkanol amine complex.

7. The composition of claim 1 wherein the titanium complex is a titanium alkanol amine complex.

8. The composition of claim 1 wherein the delay agent is selected from the group consisting of bishydroxyethylglycine, bishydroxymethylglycine, bishydroxypropylglycine, bishydroxyisopropylglycine, bishydroxybutylglycine, monohydroxyethylglycine, monohydroxymethylglycine and their alkali metal salts.

9. The composition of claim 8 wherein the delay agent is bishydroxyethylglycine.

10. The composition of claim 1 wherein the ratio of the amounts of delay agent to cross-linking agent, on a weight basis, is 0.001:1 to 100:1 of delay agent to cross-linking agent.

11. The composition of claim 9 wherein the ratio of the amounts of delay agent to cross-linking agent, on a weight basis, 0.1-10:1 of delay agent to cross-linking agent.

12. The composition of claim 1 wherein the cross-linkable organic polymer is hydroxypropylguar, carboxymethylcellulose, or carboxymethylhydroxypropylguar; the crosslinking agent is a zirconium polyol or zirconium alkanol amine complex; and the delay agent is bishydroxyethylglycine.

13. The composition of claim 12 wherein the crosslinking agent is zirconium tetra-triethanolamine complex.

14. The composition of claim 1 wherein the cross-linkable organic polymer is hydroxypropylguar, carboxymethylcellulose, or carboxymethylhydroxypropylguar; the crosslinking agent is a titanium alkanol amine complex; and the delay agent is bishydroxyethylglycine.

15. The composition of claim 14 wherein the crosslinking agent is titanium tetra-triethanolamine complex.

16. The composition of claim 1 wherein the pH buffer is a neutral buffer and the cross-likable organic polymer is hydroxypropylguar.

17. The composition of claim 1 wherein the pH buffer is an acidic buffer or a basic buffer and the cross-likable organic polymer is carboxymethylcellulose, or carboxymethylhydroxypropylguar.

* * * * *